(12) United States Patent
Padron et al.

(10) Patent No.: US 10,655,354 B2
(45) Date of Patent: May 19, 2020

(54) CUSTOM NUT SYSTEM AND METHOD OF ADAPTING NON-CONFORMING TOWER BASE

(71) Applicant: Sabre Communications Corporation, Sioux City, IA (US)

(72) Inventors: Leo Dan Padron, Springtown, TX (US); Hock Hai Lim, Alvarado, TX (US); Majed Jamel Saleh, Burleson, TX (US)

(73) Assignee: Sabre Communications Corporation, Sioux City, IA (US)

( * ) Notice: Subject to any disclaimer, the term of this patent is extended or adjusted under 35 U.S.C. 154(b) by 0 days.

(21) Appl. No.: 16/154,865

(22) Filed: Oct. 9, 2018

(65) Prior Publication Data

US 2020/0109576 A1 Apr. 9, 2020

(51) Int. Cl.
*E04H 12/22* (2006.01)
*F16B 33/02* (2006.01)
*F16B 37/00* (2006.01)

(52) U.S. Cl.
CPC ......... *E04H 12/2253* (2013.01); *F16B 33/02* (2013.01); *F16B 37/00* (2013.01)

(58) Field of Classification Search
CPC ........ F16B 33/02; F16B 25/00; F16B 35/007; F16B 37/002; F16B 29/00; F16B 5/025; F16B 7/025
See application file for complete search history.

(56) References Cited

U.S. PATENT DOCUMENTS

| | | | |
|---|---|---|---|
| 6,361,243 B1* | 3/2002 | Geib | F16B 2/065 403/369 |
| 6,923,096 B1* | 8/2005 | Kim | B25B 13/06 81/124.4 |
| 2008/0126008 A1* | 5/2008 | Rammer | G01B 11/28 702/156 |

\* cited by examiner

*Primary Examiner* — Andrew J Triggs
(74) *Attorney, Agent, or Firm* — Schwegman Lundberg & Woessner, P.A.

(57) ABSTRACT

A utility pole anchoring system and associated methods are shown. In one example, a set of anchoring nuts is provided having at least one non-standard thread dimension. In one method of anchoring, a number anchor nuts from a set of non-standard thread dimensioned anchor nuts are selected to correspond to measured deviations in anchor thread dimensions.

9 Claims, 4 Drawing Sheets

CUSTOM NUT SYSTEM AND METHOD OF ADAPTING NON-CONFORMING TOWER BASE

TECHNICAL FIELD

This document pertains generally, but not by way of limitation, to ground fixtures for anchoring utility poles such as monopoles, such as for raised antenna implementations in the field.

BACKGROUND

Utility poles such as power line poles, cellular antenna poles, etc. are large structures formed from heavy materials such as steel. They must withstand severe outdoor conditions such as high winds and high loads from supported equipment such as power lines, antenna assemblies, etc. Utility poles are frequently anchored in the ground using an array of anchor posts. In one method of anchoring, the anchor posts are threaded to accept anchor nuts after the anchor posts are cemented in place. The ground fixture containing the anchor posts can be very expensive to install, and rework of non-conforming threaded anchor posts may be cost prohibitive. It is desirable to have an anchoring system and methods that are capable of securely anchoring utility poles to non-conforming threaded anchor posts to avoid expensive removal and re-installation of the entire ground fixture.

DESCRIPTION OF EMBODIMENTS

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
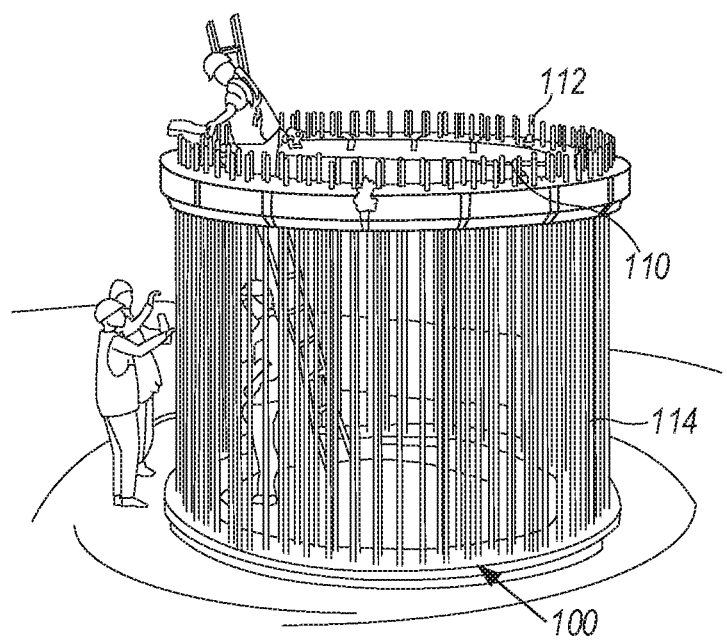
FIG. 1 shows a ground fixture for a utility pole in accordance with some example embodiments.

FIG. 1 shows a ground fixture 110 that includes a number of anchor posts 112. The anchor posts 112 and other components of the ground fixture 110 are shown partially encased in concrete 114. In one example, the anchor posts 112 are assembled into the ground fixture 110 as straight rods, without any threading. After assembly into the ground fixture 110, exposed upward ends of the anchor posts 112 are threaded to later accept anchor nuts that fasten a utility pole (not shown) to the ground fixture 110.

In one example, threads are cut onto the exposed upward ends of the anchor posts 112, using a tool such as a thread cutting die. In one example, the threads are rolled, or otherwise pressed into the exposed upward ends of the anchor posts 112, using a tool such as a thread roller. Thread rolling includes the added advantage of hardening the threads through deformation as the threads are created, forming a robust and stronger thread connection.

In the process of thread rolling, a pressure is applied to an outer diameter of the exposed upward ends of the anchor posts 112, and the thread rolling die is rotated to press in the threads. If too high a pressure is used to roll the threads, a non-conforming anchor post diameter may result. The material of the exposed upward ends of the anchor posts 112 may be pressed so hard, that too small a diameter is left after the rolling process. This creates a challenging situation, where standard thread sizes in mating anchor nuts will not securely hold against the anchor posts 112. In addition, due to variations in applied rolling pressure between individual thread rolling operations, there may be corresponding variations in thread diameter between individual anchor posts 112 in the ground fixture 110.

It can be cost prohibitive to correct the no-conforming anchor posts 112. Correction may entail breaking up of anchoring concrete, and sawing out non-conforming welded anchor posts 112 from the ground fixture 110. The present inventors have recognized that although the exposed upward ends of the anchor posts 112 may be non-conforming in diameter, they are still well within the required tensile strength to securely hold a utility pole, if a correctly fitting anchor nut were provided.

Figure 2A:
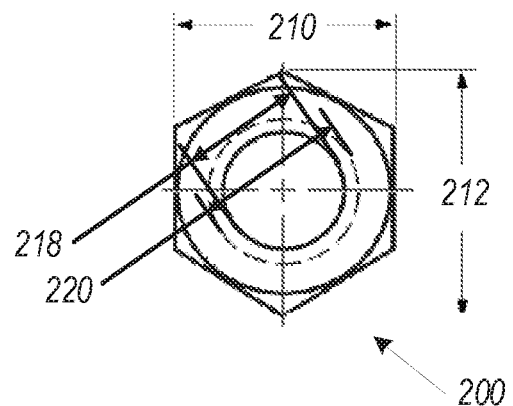
FIG. 2A shows a top view of an anchor nut for a utility pole in accordance with some example embodiments.

FIG. 2A shows a top view of an anchor nut 200 from a utility pole anchoring system according to one example of the invention. The anchor nut 200 has a minor thread diameter 218, and a major thread diameter 220. The anchor nut 200 also has a pitch diameter (not shown in FIG. 2B—defined as 226, FIG. 2C) with dimensions between the minor thread diameter 218 and the major thread diameter 220. The pitch diameter is described in more detail below.

Independent of the thread diameters, the anchor nut 200 is shown with tooling dimensions 210, 212. In one example, dimensions 210 and 212 are consistent with a standard size 2-inch anchor nut. The standard dimension of 2 inches refers to the thickness 214 shown in FIG. 2B. in one example, the standard tooling dimensions 210, 210 for a 2-inch anchor nut include a dimension of 3⅛ inches for dimension 210, and 3⅝ inches for dimension 212.

Figure 2B:
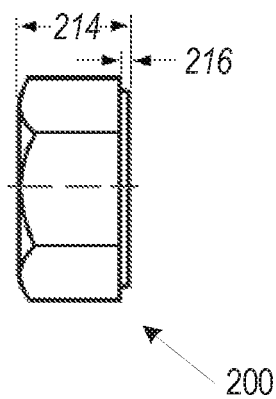
FIG. 2B shows a side view of the anchor nut from FIG. 2A in accordance with some example embodiments.

FIG. 2B further illustrates an anchor nut thickness 214, and a relief flange thickness 216. In the example of a standard 2-inch anchor nut, the anchor nut thickness 214 is 2 inches and the relief flange thickness is approximately 0.16 inches. Although a relief flange thickness 216 is shown in the example of FIG. 2B, the invention is not so limited. Other examples of anchor nuts 200 may not include a relief flange.

Figure 2C:
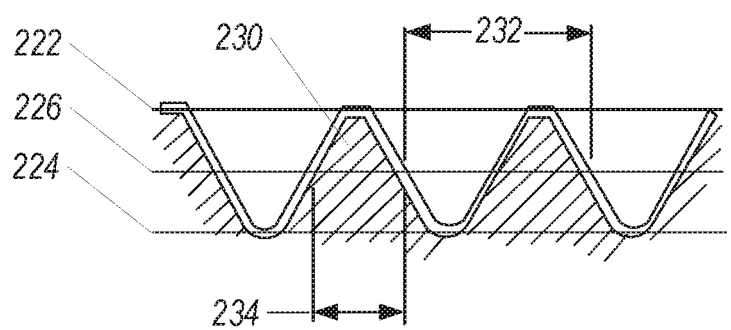
FIG. 2C shows a cross section diagram of a thread from an anchor nut in accordance with some example embodiments.

FIG. 2C shows an example cross section diagram of a thread 230 and associated thread diameters (222, 224, 226) from an anchor nut, such as anchor nut 200 from FIGS. 2A and 2B.

The pitch diameter 226 (often called the effective diameter) of a parallel thread is defined as the diameter of an imaginary co-axial cylinder which intersects the surface of the thread 230 in such a manner that the intercept on a generator of the cylinder, between the points where it meets the opposite flanks of a thread groove, is equal to half 234 the nominal pitch 232 of the thread.

The major diameter 222 of the thread 230 is the diameter of the imaginary co-axial cylinder that just touches the crest of an external thread or the root of an internal thread.

The minor diameter 224 of the thread 230 is the diameter of an imaginary cylinder that just touches the roots of an external thread or the crests of an internal thread.

Figure 3:
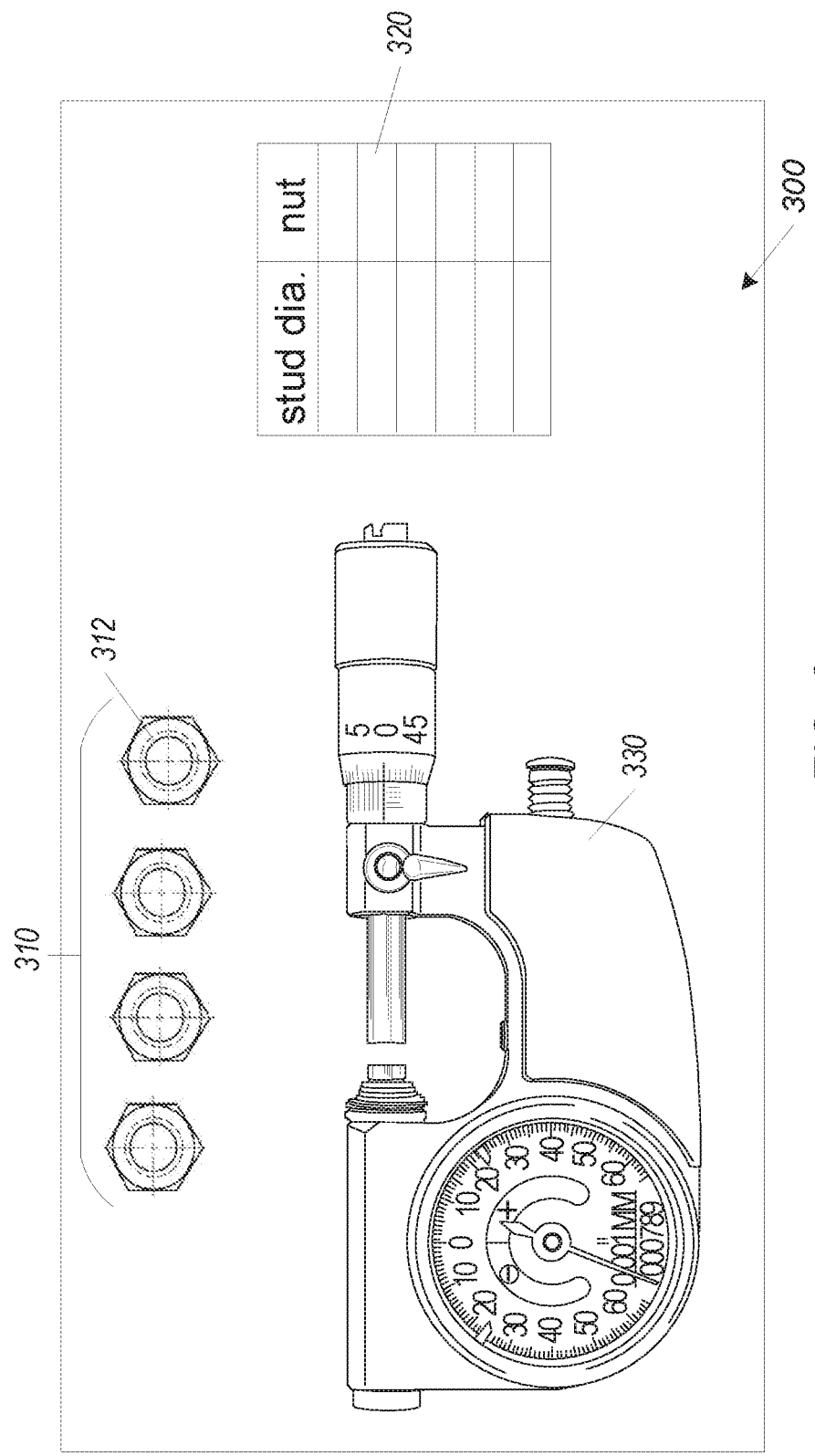
FIG. 3 shows a utility pole anchoring system in accordance with some example embodiments.

FIG. 3 shows a utility pole anchoring system 300 according to one example. A set of anchor nuts 310 is shown. The set of anchor nuts 310 includes nuts having at least one non-standard thread dimension. The example utility pole anchoring system 300 further includes a measuring device 330 to determine a diameter of an anchor post after threads have been formed on an exposed end. In the example shown, a caliper 330 is shown to measure an outer diameter of an anchor post thread. Other measuring devices such as an array of gauge holes, or gauge slots may be used.

The example utility pole anchoring system 300 further includes a chart 320 to associate an anchor nut having a listed thread dimension with an anchor post having a corresponding thread dimension. In one example, one or more of the listed thread dimensions are non-standard. The term "thread dimension" may refer to any of the above defined thread dimensions, for example minor diameter, major diameter, or pitch diameter. However, when comparing an anchor nut dimension to an anchor post dimension, the same type of dimension should be used to ensure consistent matching.

Although a chart 320 is shown, the invention is not so limited. For example, a database, spreadsheet, or other system of noting a corresponding relationship may be used without departing from the scope of the invention.

Figure 4:
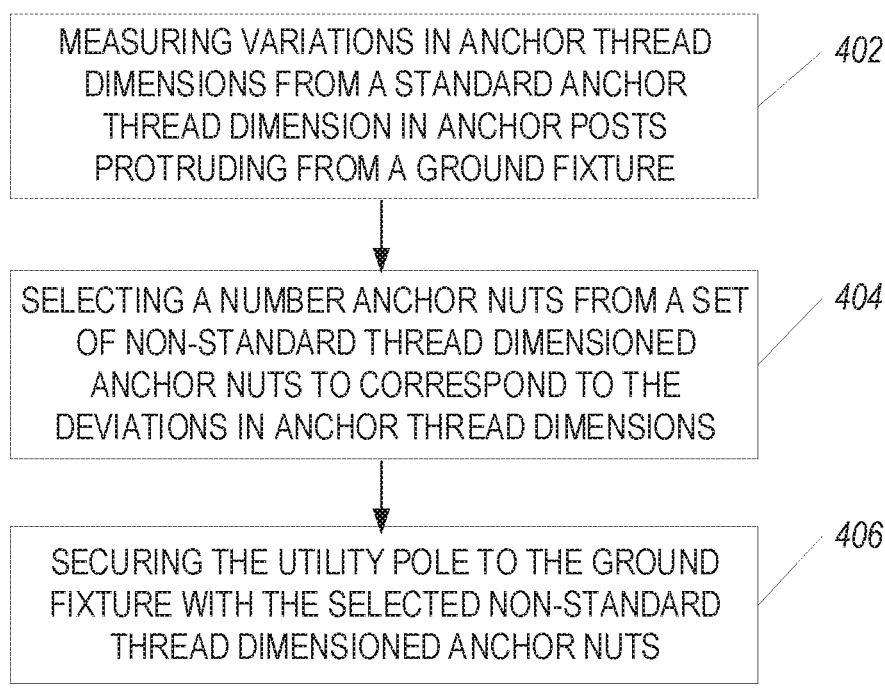
FIG. 4 shows a flow diagram of a method of anchoring a utility pole in accordance with some example embodiments.

FIG. 4 illustrates an example method of use for the utility pole anchoring system 300 of FIG. 3. Operation 402 shows a field worker or other person measuring deviations in anchor thread dimensions from a standard anchor thread dimension in anchor posts protruding from a ground fixture. In one example, a caliper 330 as shown in FIG. 3 may be used. Other types of measuring devices may be used.

In operation 404, a number of anchor nuts from a set of non-standard thread dimensioned anchor nuts are selected to correspond to deviations in anchor thread dimensions from a standard, as measured on the anchor posts. In one example, the set of anchor nuts 310 may include some standard thread dimensioned anchor nuts, however, one or more of the set of anchor nuts 310 also includes a non-standard thread dimension. In one example, the non-standard thread dimension is smaller than the standard thread dimension. In one example, the set of anchor nuts 310 includes two or more different non-standard thread dimensions, both of which are smaller than the standard thread dimension. In operation 406, the utility pole is secured to the ground fixture with the selected non-standard thread dimensioned anchor nuts.

When properly chosen from the set of anchor nuts 310, a non-standard thread dimensioned anchor nut will engage properly with a corresponding non-standard anchor post where threads are rolled or cut slightly smaller than a standard thread dimension. By having a plurality of non-standard thread dimensioned anchor nuts to choose from, several variations in threaded anchor posts can be accommodated without removal and replacement. By using utility pole anchoring systems 300, as described in the present disclosure, expensive rework of non-conforming ground fixtures is avoided.

In one example, two non-standard anchor nuts are provided in the set of anchor nuts 310, in addition to one or more standard threaded anchor nuts. The chart below shows an example of two non-standard threadings for non-standard anchor nuts M1 and M2. Although specific dimensions are shown as an example, the invention is not so limited. Other sets of anchor nuts may be used to accommodate deviations in dimension associated with different anchor posts.

| Custum Nut | Nominal Size (in) | Threads/in. | Minor Diameter (in) | | Pitch Diameter (in) | | | Major Diameter (in) |
| --- | --- | --- | --- | --- | --- | --- | --- | --- |
| | | | Min. | Max | Min. | Max | Mean | Min. |
| M1 | 2 | 4½ | 1.9880 | 2.0240 | 2.0847 | 2.0973 | 2.0913 | 2.2290 |
| M2 | 2 | 4½ | 1.9660 | 2.0020 | 2.6270 | 2.0753 | 2.0690 | 2.2070 |

One common size anchor nut for use with utility pole anchoring is a standard 2 inch nut. In the chart above, the M1 and M2 dimensions are chosen to accommodate variations from a standard 2 inch nut where anchor post threads are rolled slightly smaller than a conforming thread. In one example although the standard thread, the M1 thread, and the M2 thread are all different, the tooling dimensions are all the same. In this way, a single standard wrench/socket may be used to secure all of the anchor nuts.

Although a 2 inch standard hexagonal tooling surface is used as an example, other standard anchor nut and tooling surface dimensions are also within the scope of the invention. Although a hexagonal tooling surface is used as an example, other tooling surfaces, such as square, splined, etc. are also within the scope of the invention.

In one example all non-standard thread dimensions fall between a standard thread size, and a next smaller standard size. In selected examples, it can be important that the anchor post is only slightly smaller than the desired standard dimension. In order to provide adequate structural strength, it may not be possible to merely size down the anchor post to the next smaller standard size. The set of anchor nuts 310 described above accomplishes the goal of maintaining structural strength, while also accommodating slightly smaller non-standard thread dimensions.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

The foregoing description, for the purpose of explanation, has been described with reference to specific example embodiments. However, the illustrative discussions above are not intended to be exhaustive or to limit the possible example embodiments to the precise forms disclosed. Many modifications and variations are possible in view of the above teachings. The example embodiments were chosen and described in order to best explain the principles involved and their practical applications, to thereby enable others skilled in the art to best utilize the various example embodiments with various modifications as are suited to the particular use contemplated.

It will also be understood that, although the terms "first," "second," and so forth may be used herein to describe various elements, these elements should not be limited by these terms. These terms are only used to distinguish one element from another. For example, a first contact could be termed a second contact, and, similarly, a second contact could be termed a first contact, without departing from the scope of the present example embodiments. The first contact and the second contact are both contacts, but they are not the same contact.

The terminology used in the description of the example embodiments herein is for the purpose of describing particular example embodiments only and is not intended to be limiting. As used in the description of the example embodiments and the appended examples, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

The invention claimed is:

1. A method for anchoring a utility pole, comprising:
measuring deviations in anchor thread dimensions from a standard anchor thread dimension in anchor posts protruding from a ground fixture;
selecting a number of anchor nuts from a set of non-standard thread dimensioned anchor nuts to correspond to the deviations in anchor thread dimensions; and
securing the utility pole to the ground fixture with the selected non-standard thread dimensioned anchor nuts.

2. The method of claim 1, wherein the deviations in anchor thread dimensions includes two or more different anchor thread dimensions.

3. The method of claim 1, wherein securing the utility pole to the ground fixture includes securing using a same tooling size for all selected anchor nuts.

4. The method of claim 3, wherein securing using the same tooling size for all selected anchor nuts includes securing using hexagonal tooling.

5. The method of claim 4, wherein the tooling dimension is a standard 2-inch hexagonal nut.

6. The method of claim 3, further including consulting a chart to associate a specific size anchor nut from the set of non-standard thread dimensioned anchor nuts to correspond to individual deviations in anchor thread dimensions.

7. The method of claim 1, wherein selecting a number of anchor nuts from a set of non-standard thread dimensioned anchor nuts includes selecting non-standard thread dimensioned anchor nuts with thread dimensions that all fall between two adjacent standard thread dimensions.

8. The method of claim 7, wherein the deviations in anchor thread dimensions includes two or more different anchor thread dimensions that all fall between two adjacent standard thread dimensions.

9. The method of claim 1, wherein measuring deviations in anchor thread dimensions includes using a caliper to measure deviations in anchor thread dimensions.

* * * * *